455-608 AJ 233 EX
EIP8106 XR 3,727,061

X33-AF

United Stat...

Dworkin

[1..

[45] A...

[54] PULSE LASER COMMUNICATION SYSTEM

[75] Inventor: Larry U. Dworkin, Red Bank, N.J.

[73] Assignee: The United States of America as represented by the Secretary of the Army

[22] Filed: July 6, 1970

[21] Appl. No.: 52,498

[52] U.S. Cl. ..................250/199, 331/94.5, 325/143

[51] Int. Cl. ..................H04b 9/00

[58] Field of Search ..................250/199; 331/45, 331/50, 52, 55, 57, 94.5; 332/7.51, 42; 325/38, 143

[56] References Cited

UNITED STATES PATENTS

| | | | |
|---|---|---|---|
| 3,243,592 | 3/1966 | Tomiyasu et al. | 250/199 |
| 3,267,385 | 8/1966 | Ashkin | 250/199 X |
| 3,310,753 | 3/1967 | Burkhalter | 331/94.5 |
| 3,311,844 | 3/1967 | DiCurcio | 331/94.5 |
| 3,373,403 | 3/1968 | Huber | 325/143 |
| 3,532,890 | 10/1970 | Denton | 250/199 |
| 3,628,023 | 12/1971 | Paoli | 250/199 |

*Primary Examiner*—Benedict V. Safourek
*Attorney*—Harry M. Saragovitz, Edward J. Kelly, Herbert Berl and Daniel D. Sharp

[57] ABSTRACT

A wide band tactical pulsed laser communication system capable of operating at high bit rates wherein an incoming digital data stream, as for example, a multi-channel time division multiplexed pulse code modulated signal, first is converted into a pulse position modulated signal and the corresponding pulse position modulated pulses of each channel are applied by way of appropriate gating circuitry in sequence to an array of injection lasers, each capable of generating optical signals at relatively high peak power.

13 Claims, 5 Drawing Figures

INVENTOR,
LARRY U. DWORKIN
BY: Daniel D. Sharp,
Harry M. Saragovitz,
Edward J. Kelly & Herbert Berl
ATTORNEYS

INVENTOR,
LARRY U. DWORKIN

BY: Daniel D. Sharp,
Harry M. Saragovitz,
Edward J. Kelly & Herbert Berl
ATTORNEYS.

INVENTOR.
LARRY U. DWORKIN
BY: Daniel D. Sharp, Harry M. Saragovitz, Edward J. Kelly & Herbert Berl ATTORNEYS.

PULSE LASER COMMUNICATION SYSTEM

BACKGROUND OF THE INVENTION

Prior wide band optical communication systems have the disadvantages that the lasers and associated peripheral equipment, such as power supplies, have been bulky and often have required special coolants. Prior narrow band optical communication systems using injection lasers, such as gallium arsenide diodes, have been limited to single channel systems operating at relatively low bit rates.

SUMMARY OF THE INVENTION

By the use of appropriate coding and pulse processing techniques and by pulsing sequentially an array of diode lasers, one can extend the techniques formally used with narrow band optical communication systems to wide band operation.

The pulsed laser communication system of the invention includes a transmitter capable of radiating optical data of high bit rate and high power. By converting the modulation of the input data to pulse position modulation, one can reduce the effective bit rate sufficiently to permit operation in sequence of each laser of an array of as many lasers as there are bits in the bit word or group (or one more than the number of bits if a synchronized pulse is needed). By way of example, a pulse code modulated signal from a 12, 24, 48-channel PCM multiplexed system is converted to a PPM signal and a 6-bit group, which constitutes a binary word representing one sample of a speech signal, is converted to one of 64 pulse positions. If allowance is made for a guard band, the resulting PPM pulse width then is about 108.5 nanoseconds for a 12-channel system 54.25 nanoseconds for a 24-channel system and 27.12 nanoseconds for a 48-channel system, corresponding to pulse rates of 96 kilohertz, 192 kilohertz and 384 kilohertz, respectively. An additional frame pulse maybe inserted in the guardband of the last channel.

The converted PPM pulses are assigned to one of 6, 12 or 24 pulse lasers or diodes or 6 lasers operating at 16, 32 or 64 kilohertz respectively, depending upon the number of multiplexed PCM signals, and the lasers are pulsed in sequence. In the cases of a 12-channel PCM multiplex system, the first laser in the transmitter would transmit the PPM pulses of channels 1 and 7, the next laser pulsed would transmit the pulses of channels 2 and 8, and so forth. The pulsing rate for each PPM channel of such a 12-channel system would be 8 kilohertz, so that the pulsing rate of each individual laser would be only 16 kilohertz. Low speed pulsed lasers made of gallium arsenide are readily realizable which can operate at pulsing rates of 16 kilohertz and can produce in excess of 10 watts peak power at room temperature for duty cycles of the order involved here. Furthermore, it is possible to mount the number of such lasers on a heat sink within an integrated circuit package; for example, 6 such lasers can be mounted in a package less than one-half inch square and 1 inch long. Moreover, this package need not use any coolants such as liquid nitrogen or liquid helium. Radiant energy emanating from each laser is properly directed by means of suitable optics including a collimating lens so that the optical beamwidth is maintained within reasonable limits. Because of the relatively high power intensity developed with the slower rate of laser pulsing, one can tolerate considerable beam broadening, thus avoiding the need for precise target acquisition and tracking. A portion of a pulsating transmitted optical beam is intercepted at the receiver and focused with a lens onto a photo-detector and the electrical PPM signals detected by the receiver detector are reconverted to PCM electrical signals by a PPM-to-PCM converter in receiver which is synchronized with the PCM-to-PPM converter in the transmitter, as by means including an accurate phase-locked oscillator.

In some cases, very heavy fog, rain or snow may limit the effective range of a system as heretofore described. In other instances, one may wish to communicate over a path having intervening obstacles, such as a forest, which block line of sight optical transmission. In such instances, one or more repeaters can be inserted in the transmission path between the transmitter and the receiver. The optical signal from the transmitter (or preceding repeater, in the case of multiple repeaters), is both filtered and focused by an appropriate optical system in the repeater and the repeater received signal after filtering, is focused by a lens system upon a semiconductor photodiode detector. The arrangement of filter, lens, and diode detector in the repeater can be identical to that used in the receiver. The detected signal then is amplified and directed by suitable gating circuitry so as to drive an array of diode lasers in synchronism with the driving of the transmitter and receiver lasers. This synchronism does not require synchronized pulses since the gating circuitry in the repear is supplied by the transmitted laser beams in the order in which they are propagated. If the lasers in the transmitter are sequentially driven, then the repeater gating circuitry will result in the repeater being sequentially fired. The gating may be designed to fire one or more groups of repeater lasers simultaneously if more power is desired, as explained in connection with the transmitter. The repeater also includes optical means, such as provided in the transmitter, for properly directing the optical beams from the lasers toward the receiver along the desired transmission path. Since the power requirements for such a system are small, the repeater can be battery powered and left unattended. The repeater also has the same advantages as the transmitter and receiver, namely, extreme ruggedness, compactness, light weight and capability of operation at reasonable ambient temperatures. The front end optics and the output optics of the repeater may be mounted on an adjustable swivel so that the optical beam received from the transmitter can be intercepted along the direction of transmission and redirected along a different path to avoid opaque obstacles.

DETAILED DESCRIPTION OF THE PREFERRED EMBODIMENT

Figure 1:
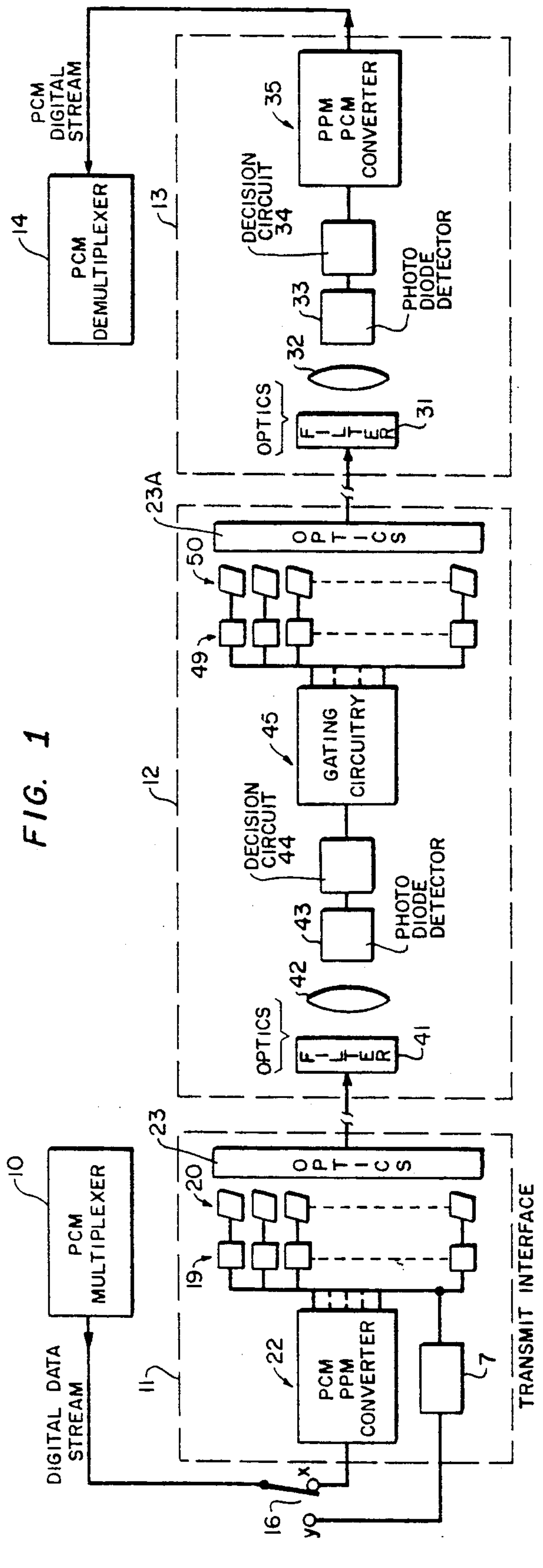
FIG. 1 is a diagram of a pulse laser communication system according to the invention.

A typical laser communication system according to the invention is shown in FIG. 1 and includes a transmit interface 11 which receives a serial digital data stream; one example of such a data stream is a pulse code modulated stream which has certain advantages, such as increased security, for communications. If a pulse code modulated input data stream is used, the system of FIG. 1 further includes a pulse code modulation (hereinafter referred to simply as PCM) multiplexer 10 coupled to the transmit interface 11 and a PCM demultiplexer 14 connected to the receive interface 13. In some instances, a laser repeater 12 is inserted between the transmit interface 11 and the receive interface 13, as shown in FIG. 1. For purposes of explanation, a PCM system with PCM input data to the transmit interface and PCM output data at the receive interface will be assumed, in describing the invention, although the invention does not require PCM data, and the PCM multiplexer may be replaced by any desired source of a serial digital data stream.

An array 20 of lasers 20*a* to 20*n* is adapted to be fired sequentially in response to a digital data stream originally emanating from multiplexer 10. These lasers can be diode lasers, sometimes referred to as injection lasers, which are mounted in a miniaturized package on a heat dissipating substrate. The lasers, for example, can be gallium arsenide lasers having the opposed major surfaces electroded, with one electrode being a common grounded electrode and the other electrode being connected to a positive driving pulse, in a manner to be explained subsequently. The incoming digital data, whether PCM or otherwise, consists of a plurality of bits of different weight or significance arranged in a group often referred to as a word which can represent a sample from a speech or data channel. For purposes of illustration the PCM multiplexer 10 will be assumed to operate with 12 channels, each consisting of one 6-bit word and a PCM system of 576 kilobits will be assumed. It should be noted that the invention is not limited to the above number of channels or to the above bit rate. For example, bit rates of the order of 10 megabits or more are feasible in modern data communication systems. The bit frequency for a typical system is 576 kilobits and the bit interval is 1.736 microseconds; for a 12-channel system, a total of 72 bits are required and the channel period is 125 microseconds. A frame pulse is generated in the multiplexer 10 at the beginning of each 12-channel period and thus occurs at a frequency of 8KHz. The frame pulse is made about twice the width of each PPM pulse in order to allow for subsequent separation of the frame pulse from the bit pulses at the receive interface 13.

The digital data stream to be used is applied by way of appropriate driver circuits 19 to an array 20 of corresponding lasers. In the example illustrated and described, 7 such lasers are used, 6 for channels plus 1 for frame. The number of lasers depends upon the number of channels. For example, if a 24-channel multiplex system is used instead of a 12-channel system, the number of channel lasers could be doubled, or, alternatively, the number of channel diodes could be left fixed and the pulse rate of each diode could be doubled. If one can dispense with transmission and reception of a frame pulse for synchronizing purposes, the framing diode is not needed.

If one were to apply sequentially PCM bits to a single laser, one would have to fire it at a 576 kilbit rate, in the example assumed. Presently available solid-state lasers are not designed to fire at such rates and furthermore if one exceeds a certain rate, the laser diodes cannot withstand the peak power level associated with such pulse rates. The problem is magnified if the system is to operate at even higher PCM bit rates; the firing rate for such a system would then become well beyond the present capability of injection lasers.

In order to use PCM systems with bit rates of the order of 576KB or more, it is necessary to fire the diode lasers 20*a* to 20*n* at a much slower rate. This can be done by converting the PCM data stream to a pulse position modulated (hereinafter referred to as PPM) data stream by means of the PCM to PPM converter 22 located at the transmit interface 11. The function of converter 22 is to convert each 6-bit PCM code (word or channel) to a single pulse which occurs at some time period within the word or channel period determined by the PCM code. It is customary to provide a portion of the PPM channel period as a guard band for such purposes as timing. If one divides the channel period into 96 intervals, the system designed is simplified and one can set aside, say, the first 32 times slots of the channel period for a guard band and the remaining 64 time slots for the PPM code. For example, if a given PCM word or channel consists of the bits 000000, a PPM pulse code occurs at the 33rd time slot of the channel, whereas a PCM code of 111111 should be converted to a PPM pulse occurring during the 96th time slot of the channel period. It is evident that, since PPM pulses will occur during each channel period of 96KHz, the average rate occurrence of PPM pulses is 96/6 or 16kilobits, representing a reduction of 36 in the pulsing rate. This 16 kilobit pulse rate is now well within the permissable pulsing rate for such injection lasers. The average PPM pulse interval is equal to one ninety-sixth of the channel interval of 10.416 microseconds or 108.5 nanoseconds, which corresponds to a bit rate of 9.216 megabits. Proper timing of the PCM to PPM converter 22 is achieved by a phase-locked oscillator (see FIG. 3) within the converter which operates at a frequency of 9.216MHz and will be explained more fully later. When switch 16 of FIG. 1 is in poistion *x*, the PPM pulses are now sequentially applied to appropirate aaser drivers 19a to 19n to fire the lasers 20*a* to 20*n* in sequence in a manner to be described in detail in connection with the analysis of FIG. 3. In some applications, for the sake of increased power, it may be desirable to fire all of the lasers in the laser array 20 at once. This can be accomplished when switch 16 is in position *y*. The incoming data then is applied through a switching circuit 7 which excites all the laser drivers simultaneously at a lower repetition rate.

Figure 2:
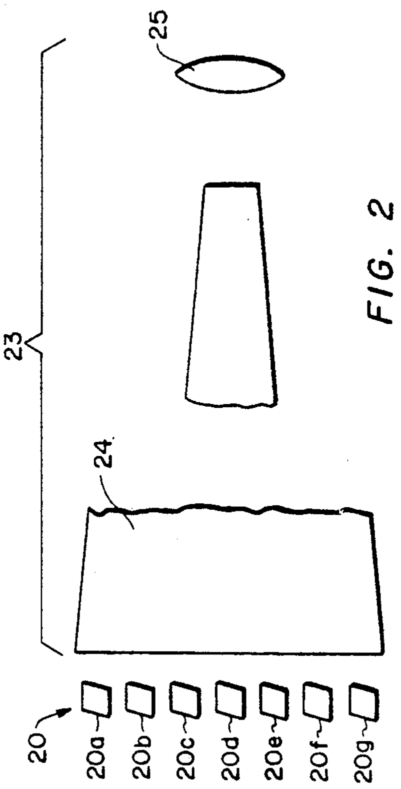
FIG. 2 is a view illustrating typical optics for the transmit interface of the system of FIG. 1.

As each laser diode is fired, it emits an optical pulse which is passed through appropriate optics 23. As indicated in FIG. 2, the optics can include an optical integrator 24 and a positive lens 25. The optical integrator 24 is a triangular-shaped optical wedge having the entrance aperture arranged adjacent the laser array 20. The length of the integrator 24 is about three times the entrace aperture and the exit aperture is slightly larger than the spacing between the adjacent lasers of the laser array 20. The purpose of this optical integrator 24 is to prevent differential spreading of the laser beams from the different lasers of the array so that, regardless of the position of the laser with respect to the axis of the array, the output optical beam from the transmit interface 11 always follows the same path substantially centered on the axis of the array. The laser pulse then is collimated by a positive lens 25 prior to being transmitted through the propagating medium. In some application in which the range is sufficiently short, it may be possible to dispense with the transmit optics 23. In such cases, some power must be sacrificed because of spreading of the laser beam and the displacement of the lasers from the axis of the laser array.

Figure 3:
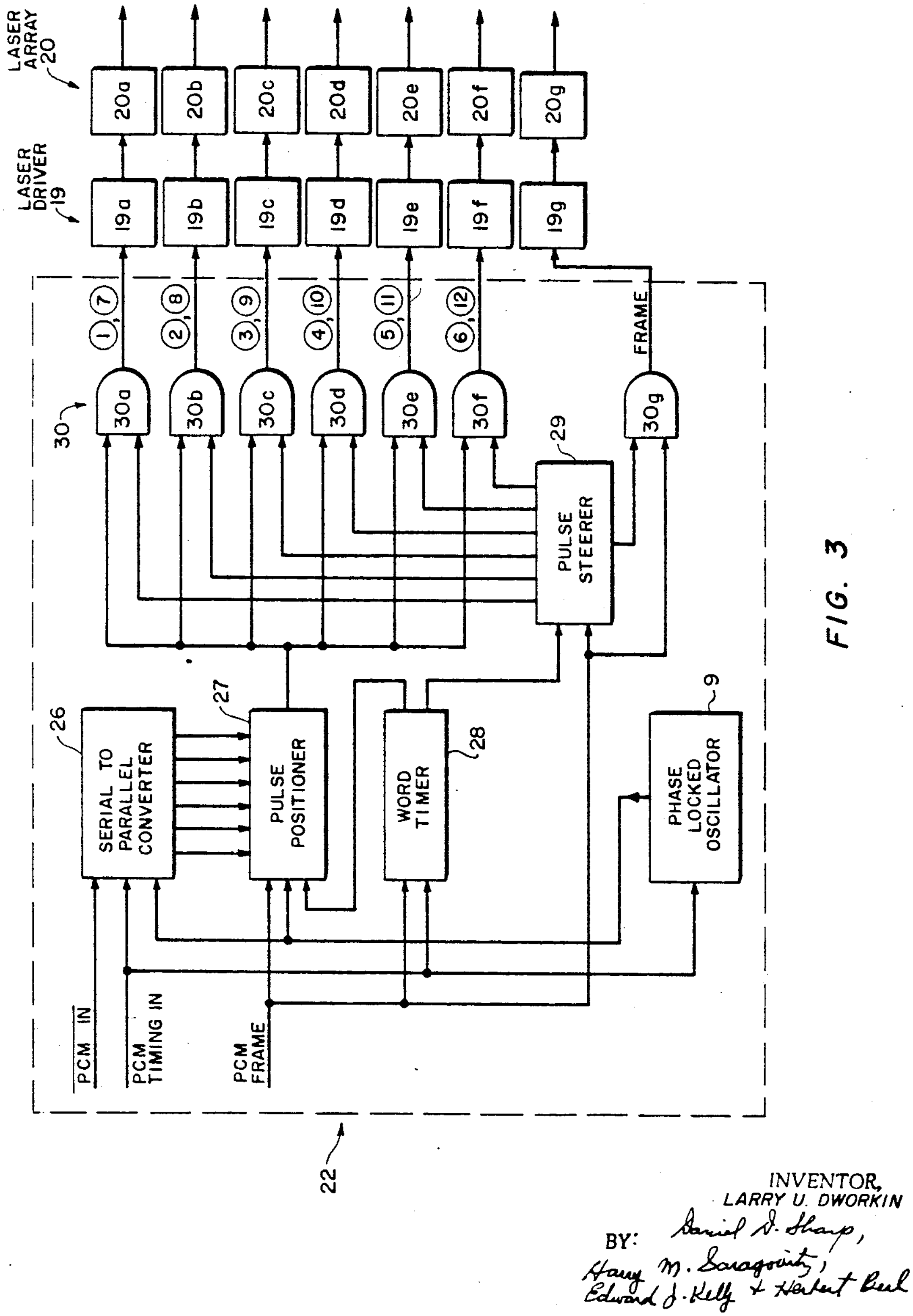
FIG. 3 is a block diagram showing the PCM to PPM converter used in the transmit interface of FIG. 1.

A typical PCM to PPM converter 22 is shown in FIG. 3 and comprises a serial-to-parallel converter 26 to which the PCM or serial pulse train from the multiplexer or digital source 10 is supplied. The contents of the converter 26 are loaded into a pulse positioner 27 which is a 7-stage counter having a stage for each of the channel bits plus a final stage which is set to a ONE by an output pulse from word timer 28 at the start of each channel or word. The operation can be simplified by loading the compliment of the PCM word into the converter 26 instead of the word itself; this is indicated by the designation $\overline{PCM}$ in FIG. 3. The phase-locked oscillator 9 is locked to the 16th harmonic of 576KHz — the bit rate associated with the PCM data stream — and thus provides a sinusoidal output of 9.216MHz. The phase-locked oscillator 9 is necessary because of unavoidable frequency drift of the PCM multiplexer 10 which supplies the PCM data to converter 22. Oscillator 9 operates at the PPM bit rate which is 16 times the frequency (576KB) of occurrence of PCM bits. The converter 22 further includes a pulse steerer 29 and a plurality of AND gates 30*a* to 30*g* and a corresponding plurality of laser drivers 19*a* to 19*g* connected in the output circuit of the AND gates. As the PCM pulses comprising a given word or channel are applied to the serial-to-parallel converter 26, the compliment of this PCM word is actually loaded into the register of the converter 26. At a subsequent time equal to six PCM pulse periods (one word) an output is derived from the word time counter 28 which is essentially a divide-by-six counter, in the example assumed, producing pulses at a 96KB rate for each pulse word or channel. This word pulse which occurs at the beginning of the next channel, resets the 7th stage of the pulse positioner counter 27 to a ONE and the operation is repeated for each successive word. If, for example, the PCM code for a given channel is 010101, the code 101010 (number 21) would be loaded in the 6 stages of the register in converter 26. At the same time a ONE is loaded into the 7th register stage by a word pulse at the beginning of a given channel period. Immediately, the contents of the register in converter 25 are transferred in parallel to the pulse positioner 27, which is a zero to 64 counter. This positioner 27 starts to count at a 9.216 kilobit rate and, in the example given, after 21 counts, all steps of the counter will be a ONE. When the next pulse at the 9.216 megabit rate arrives, it changes all ONES, including that of the last stage of the register in converter 26 to zero. This transition from a 1 to a 0 in this last stage results in a pulse output from the pulse positioner 27 which is applied to each of AND gates 30*a* to 30*g*.

The 96KHz output of the word timer 28 also is applied to a pulse steerer 29 which essentially is a counter having a number of stages equal to the number of lasers. At the beginning of each succeeding word, an output is derived from the next stage of the pulse steerer counter and the pulse is applied along appropriate output lines to the next AND gate. The pulse steerer 29 is reset during each frame by an 8KHz frame pulse. One input of each AND gate thus receives an input in the form of a PPM pulse once during each channel period and at the time within the channel period determined by the PCM code. In addition, the other input to any given AND gate is energized only once for every 6-channel period and this second input lasts for the duration of the channel period. Consequently, an output will appear at AND gate 30*a* during channel periods 1 and 7, an output will appear at AND gate 30*b* during channel periods 2 and 8, and so forth, as indicated by the encircled numerals on the AND gate output line in FIG. 3. As shown in FIGS. 1 and 3, the frame pulse is applied directly to a separate laser driver 19*g* to fire a seventh laser 20*g* which provide a framing optical pulse. Alternatively, one can use 6 lasers and 6 driver stages. With this approach, the output of a given gate 30*a* would not represent a given pair of channels. As an example, AND gate 30*a* would follow the sequence 1, 7, frame, 6, 12, 5, 11, 9, 10, 3, 9, 2, 8 . . . . before repeating again. This means that the pulse steerer would have to change to count to 78, instead of to 6, to avoid ambiguity.

It should be noted, before proceeding further, that a complete communications system can be achieved without the laser repeater 12 of FIG. 1. The transmitted laser PPM pulses then are received directly at the receive interface 13 without the intermediary of a repeater. The system first will be described without such a repeater.

Figure 4:
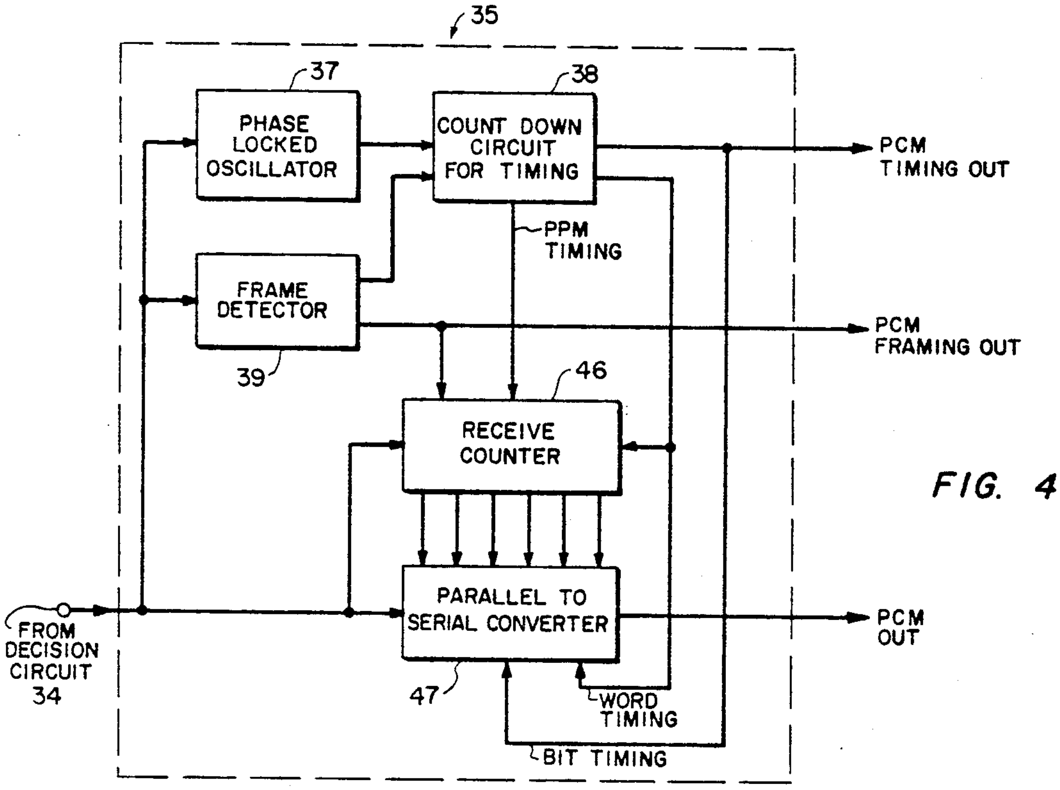
FIG. 4 is a block diagram of a PPM to PCM converter used in the receive interface of the system of FIG. 1.

A transmitted pulse laser beam is received by the receive interface 13 which comprises suitable optics such as a filter 31 and focusing lens 32, as well as a photodetector 33, a pulse decision circuit 34 and a PPM to PCM converter 35 for converting the PPM pulses back to PCM pulses for use in the PCM demultiplexer 14. A filter 31 is used to remove background radiation and must be sufficiently wide to allow for frequency drift of the transmitter lasers 20 resulting from temperature change and from manufacturing tolerances. The focusing lens 32 focuses the received pulse laser beam onto a suitable photo-detector 33 which may be an avalanche photodiode. The detector 33 serves to convert the transmitted PPM optical pulses into electrical PPM pulses. The detected signal is now passed through a decision circuit 34, which, in addition to performing an amplfication function, determines the presence of PPM coded pulses; the output of the decision circuit is applied to the PPM to PCM converter 35 which is illustrated in detail in FIG. 4 and will now be described.

The PPM to PCM converter 35 at the receiving interface 13 includes optics 31, 32, a phase-locked oscillator 37, timing circuit 38, frame detector 39, receive counter 46 and parallel-to-serial converter 47. The phase-locked oscillator 37 is identical in construction to the phase-locked oscillator 9 at the transmitter interface 11 and likewise operates at the frequency of 9.216MHz. The phase-locked oscillator output is applied to the timing circuit 38 which includes means for counting down by 16 to provide bit timing pulses for the converter 47 and a PCM timing output of 576KHz for the PCM demuliplexer 14. The timing counter circuit 38 also includes an output which counts down by 96 the phase-locked oscillator frequency of 9.216MHz; the 96 kilobit pulses so derived are used as word timing pulses to reset the received counter 46 and the counter in converter 47. The frame detector 39 is a pulse width detector responsive only to the frame pulses of larger pulse width and the output thereof is used to reset the timing counter 38 to zero at the end of each frame period. The frame detector output is also made available to the demultiplexer 14 and saves search time for the frame pulse by the demultiplexer equipment in the event that the transmitted signals become lost temporarily in the transmission medium between transmitter and receiver. The received PPM pulses, after amplification and detection by pulse decision circuit 34, are applied to the receive counter 46 which is driven by PPM timing clock pulses of 9.216 megabit rate from the timing circuit 38 so that the receive counter 46 starts counting at a rate of 9.216 megabits immediately after resetting of the receive counter to zero by the 96 kilobit word timing pulse.

At the time of arrival of the PPM signal, the count in the receive counter 46 is transferred into the parallel-to-serial converter 47. The count then corresponds to a given time location of the PPM pulse and the inverse procedure of the equipment within the dotted box 22 of FIG. 3 has occurred. The converter 47 is then sequentially unloaded at the bit timing rate of 576KB to form the PCM output.

Figure 5:
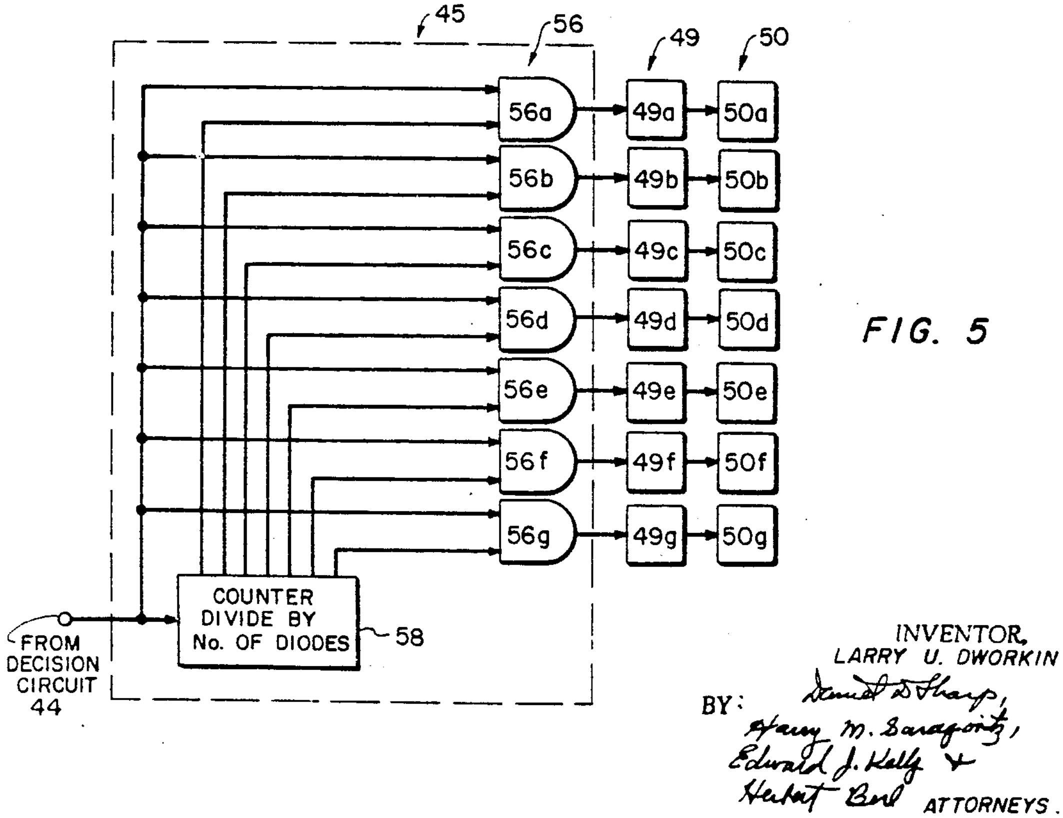
FIG. 5 is a block diagram of the gating circuitry for the laser repeater of the system shown in FIG. 1.

As explained previously, some applications may require a boost in power or a change in signal direction between the transmit interface 11 and the receive interface 13. In such cases, a laser repeater 12 is inserted in the transmission path, as shown in FIG. 1. In such cases, the transmitted PPM laser pulses are received by repeater optics which can include a filter 41 and focusing lens 42 identical to those used in the receive interface 13. The pulsed optical beam from the transmit interface 11, after appropriate filtering, is focused by the lens 42 onto a suitable detector 43, which may be identical to the detector 33 used in the receive interface 13. After conversion of the PPM optical pulses to PPM electrical pulses by the detector, the detected pulses pass through pulse decision circuit 44, similar to the decision circuit 34 in receive interface 13 and are applied sequentially by means of gating circuitry 45 to the laser drivers **49*a* to 49*g* for the corresponding lasers 50*a* to 50*g* of the repeater. The details of the gating circuitry 45 are shown in FIG. 5. The received laser pulses, after detection and amplification, are applied to a first input of each of the AND gates 56*a* to 56*g*. The counter 58 is adapted to divide by the number of laser diodes; in the example shown, therefore, the count-down ratio is seven and seven separate output lines from the counter 58 are connected to a second input of a corresponding one of the seven AND gates 56*a* to 56*g*. The output of each AND gate is connected to one of the laser driver stages 49*a* to 49*g* for the respective repeater laser diodes 50*a* to 50*g*. When a given laser pulse arrives from the transmitter 11, it will operate the counter 58 and provide an output at the next level; at the end of seven counts the counter will start counting again. In this way the AND gates 56 are opened sequentially and, since, the laser pulses received by the repeater are arriving in the sequence of firing of the transmitter lasers 20*a* to 20*g*, the repeater lasers 50*a* to 50*g* are fired in the same sequence. As explained previously, only six instead of seven AND gates 56 are required. Disposed adjacent to the array 50 of repeater lasers 50*a* to 50*g* are optics 23A similar to the optics 23 of the transmit interface 11 described in FIG. 2 and serving the same function as the transmitted optics 23. The laser pulses from the laser array 50 in the repeater are now retransmitted toward the receive interface 13** of FIG. 1.

Where changes in direction of transmission are required, the array 50 of repeater lasers and the associated optics 23A can be mounted on a rotating platform so as to direct the beam along any desired path, depending on the location of the receive interface 13.

While the invention has been described in connection with specific illustrative embodiments, variations thereof will be apparent to those skilled in the art. For example, if the incoming data stream to the transmit interface is other than a PCM stream, the converter 22 of the transmit interface will be other than a PCM to PPM converter and will be adapted to provide any necessary conversion so that PPM pulses will be supplied to the laser drivers. Hence, the scope of the invention should be limited only by the appended claims.

What is claimed is:

1. A pulse laser communication system comprising means for generating a multi-channel pulse stream consisting of a number of digital input data pulses, means for converting said input data pulses of each channel into a lesser number of pulse position modulated data pulses, an array of lasers, and means for sequentially applying individual ones of said pulse position modulated pulses from each channel to corresponding ones of said lasers to generate in sequence laser optical pulses.

2. A pulse laser communication system according to claim 1 wherein said data input pulses generated by said means for generating are in the form of pulse code modulated pulses.

3. A pulse laser communication system according to claim 1 further including optical means for directing the optical pulses from said lasers along a transmission path, and receiving means for receiving the laser optical pulses directed along said transmission path, said receiving means including means for detecting said propagated optical pulses and converting said detected optical pulses into electrical data output pulses of the same form as said digital input data pulses.

4. A pulse laser communication system according to claim 3 wherein said data input pulses generated by said means for generating and said output pulses from said means for detecting are in the form of pulse code modulated pulses.

5. A pulse laser communication system according to claim 3 further including a laser repeater interposed between said optical means for directing and said receiving means; said laser repeater comprising a plurality of repeater lasers and gating means for sequentially firing said repeater lasers in response to said optical pulses directed along said path.

6. A pulse laser communication system according to claim 5 further including beam optics for propagating said repeater laser pulses toward said receiving means along a second transmission path.

7. A pulse laser communication system according to claim 1 wherein said lesser number is one.

8. A pulse laser communication system according to claim 1 wherein said lasers are diode injection lasers.

9. A pulse laser communication system according to claim 7 wherein said lasers are diode injection lasers.

10. A pulse laser communication system according to claim 2 wherein said lasers are diode injection lasers.

11. A pulse laser communication system according to claim 3 wherein said lasers are diode injection lasers.

12. A pulse laser communication system according to claim 4 wherein said lasers are diode injection lasers.

13. A pulse laser communication system according to claim 5 wherein said lasers are diode injection lasers.

* * * * *